United States Patent
Mallick et al.

(10) Patent No.: US 6,427,226 B1
(45) Date of Patent: Jul. 30, 2002

(54) SELECTIVELY REDUCING TRANSISTOR CHANNEL LENGTH IN A SEMICONDUCTOR DEVICE

(75) Inventors: Dhiraj Mallick, Sunnyvale; Jacob Thomas, San Jose; Rajesh Khanna; Anil L. Pandya, both of Fremont; Satish Kumar Raj, Sunnyvale, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/318,782

(22) Filed: May 25, 1999

(51) Int. Cl.$^7$ .............................................. G06F 17/50
(52) U.S. Cl. ..................................................... 716/10
(58) Field of Search .................. 716/10, 5, 8; 364/489, 364/488

(56) References Cited

U.S. PATENT DOCUMENTS

| | | | |
|---|---|---|---|
| 5,579,510 A | 11/1996 | Wang et al. ................. 395/500 |
| 5,726,918 A | 3/1998 | Giramma et al. ........... 364/578 |
| 5,790,830 A | 8/1998 | Segal ........................... 395/500 |
| 5,831,866 A | 11/1998 | Burgun et al. .............. 364/488 |
| 5,872,717 A | * 2/1999 | Yu et al. ...................... 364/489 |
| 5,880,967 A | 3/1999 | Jyu et al. ..................... 364/489 |
| 5,903,466 A | * 5/1999 | Beausang et al. ........... 364/488 |
| 6,189,131 B1 | * 2/2001 | Graef et al. .................... 716/8 |
| 6,205,572 B1 | * 3/2001 | Dupenloup ..................... 716/5 |

* cited by examiner

Primary Examiner—David Nelms
Assistant Examiner—Thong Le
(74) Attorney, Agent, or Firm—Skjerven Morrill MacPherson LLP

(57) ABSTRACT

Tools and techniques used in conjunction with integrated circuit path timing information can selectively reduce the channel length of transistors in cells associated with the most critical paths in an integrated circuit, while keeping the overall integrated circuit design within a specified power budget. Moreover, by targeting pins of cells (and thus their associated transistors) that are used by multiple paths, and/or that offer the greatest potential speed improvement, timing violations along critical paths can be reduced or eliminated with a relatively few number of replacements. Paths within a certain timing violation range are selected for analysis. The pins within those paths are ranked by pin criticality, which can depend on, for example, the number of times a particular pin occurs in any path, the timing enhancement associated with replacing a cell having that pin, and the impact of replacing a cell having that pin would have on the power budget. Transistors within cells (or entire cells) associated with pins are replaced based on the pin criticality until timing improvements are sufficient to remove a path from the range of paths being examined. Successive paths, and ranges of paths are analyzed until the power budget is exceeded, or no more improvements can be made.

29 Claims, 3 Drawing Sheets

SELECTIVELY REDUCING TRANSISTOR CHANNEL LENGTH IN A SEMICONDUCTOR DEVICE

BACKGROUND OF THE INVENTION

1. Field of the Invention

This invention relates to tools for designing digital circuits and analyzing digital circuit designs, and particularly to reducing transistor channel length in digital circuit designs.

2. Description of the Related Art

One of the goals in designing synchronous integrated circuits, and particularly very large scale integrated (VLSI) circuits, including application specific integrated circuits (ASICs), general purpose processors, embedded processors, and digital signal processors (DSPs), is high speed operation. To that end, a variety of computer aided design (CAD) tools are used to design, analyze, and simulate integrated circuits. In the process of designing integrated circuits, often referred to as electronic design automation (EDA), a particular integrated circuit (or section thereof) is typically described by a netlist. The netlist is a list of circuit components or cells and interconnections between the circuit components. The various cell input terminals and output terminals through which cells are connected to each other are often referred to as pins or nodes. Determining how fast a given circuit can operate depends in large part on the timing of signals arriving at, and being transmitted from various cells in the circuit. At least two main approaches are used in EDA for timing verification and analysis during the circuit design process, dynamic timing and static timing.

Traditionally, dynamic timing analysis has been used to verify the functionality and timing of an entire design or blocks within a design. Dynamic timing analysis uses vectors provided by the designer and performs logic simulation with timing values to verify the timing behavior of the circuit. Dynamic timing analysis is difficult to use because the designer must provide the input signal patterns and analyze the output wave forms to verify that the circuit functions correctly at the intended speed. Dynamic verification has the advantage that the timing behavior of any design can be analyzed and dynamic verification offers a high degree of accuracy by correctly modeling the Boolean interaction between signals.

However, designers have to create separate timing and functional vectors for dynamic timing analysis, and thus the quality of the dynamic timing analysis is limited by the input stimuli provided by the designer. Additionally, it can be difficult to create timing vectors that will exercise each path in the design exhaustively. For example, if the designer does not correctly specify the input condition that triggers the worst-case delay path in the circuit, the dynamic timing analysis may result in an optimistic value for the circuit speed. Finally, dynamic timing analysis requires extensive computer resources because a large number of input signal patterns must be simulated to offer a high degree of confidence in the results. The vector generation problem is magnified as the size and complexity of designs increase. The advent of larger designs and enormous vector sets make dynamic simulation a serious bottleneck in design flows.

To combat many of these problems, static timing verification is increasingly being used. Static timing analysis is an exhaustive method of analyzing, debugging and validating the timing performance of a design. This is achieved by breaking down the design into sets of paths. A static timing analyzer assesses circuit timing performance by relying upon timing attributes, as specified in a library of timing models, for individual circuit components in the netlist. The library of timing models includes timing information for each circuit component in the netlist. The timing information includes such information as the input pin capacitance, input-to-output delay, and output drive strengths. Combining this library along with a design netlist, a static timing analyzer generates critical path timing information statically without knowledge of the design's logical functionality. The delay of each path in the design is calculated and checked against timing assertions for any possible violation that would effect performance or limit operating frequency. Different types of checks that can be performed by a static-timing analysis tool include setup time (the length of time that a data input pin must be stable before an active clock transition), hold time (the length of time that a data input pin must be stable after an active clock transition), recovery (the length of time that an asynchronous control input pin must be stable before a clock active-edge transition), removal (the length of time that an asynchronous control input pin must be stable after a clock-active edge transition) and clock pulse width. Static timing analysis is exhaustive in that every path in the design is checked for timing violations. This is a benefit over dynamic simulators, which would require a large number of vectors in order to provide the same level of timing coverage. Since static timing analysis is not based on functional vectors, it is typically fast and can accommodate large designs. Static timing analysis does suffer from at least one drawback, false paths. Because the analysis typically considers all possible paths, some paths which will logically never be used can be included in the analysis unnecessarily.

Static timing verification can identify those cells and paths that are critical to the operation, but that is only part of the process. Design changes must be made to reduce or eliminate timing violations. One solution to improve timing along a critical path is to replace one or more of the field effect transistors (FETs) along the path (e.g., transistors in a cell along the path) with a similar transistor having a shorter channel length between the source and drain regions, thereby reducing the channel transit time (i.e., the average time required for an electron to traverse a FETs channel from source to drain), as is well know by those having ordinary skill in the art of circuit design. Because the transit time is reduced, propagation times associated with the transistor are improved, and paths that previously had timing violations can be brought within timing requirements.

Unfortunately, replacing a given transistor with a similar transistor having a shorter channel length does have at least one drawback. Leakage currents associated with a transistor tend to increase with decreasing channel length. For example, one common component to transistor leakage currents, a subthreshold channel current, is known to be inversely proportional to channel length. Increased leakage currents are a concern of integrated circuit designers because the integrated circuit usually has a defined power budget, e.g., approximately 8 W for a processor designed for portable computers, and any increase power drain associated with leakage currents must fall within the power budget.

Accordingly, it is desirable to have integrated circuit design tools and techniques for selective sizing down the channel lengths of transistors in timing critical paths in the integrated circuit, while staying within a power budget.

SUMMARY OF THE INVENTION

It has been discovered that tools and techniques used in conjunction with integrated circuit path timing information can selectively reduce the channel length of transistors in cells associated with the most critical paths in an integrated circuit, while keeping the overall integrated circuit design within a specified power budget. Moreover, by targeting pins of cells (and thus their associated transistors) that are used by multiple paths, and/or that offer the greatest potential speed improvement, timing violations along critical paths can be reduced or eliminated with a relatively few number of replacements. Paths within a certain timing violation range are selected for analysis. The pins within those paths are ranked by pin criticality, which can depend on, for example, the number of times a particular pin occurs in any path, the timing enhancement associated with replacing a cell having that pin, and the impact of replacing a cell having that pin would have on the power budget. Transistors within cells (or entire cells) associated with pins are replaced based on the pin criticality until timing improvements are sufficient to remove a path from the range of paths being examined. Successive paths, and ranges of paths are analyzed until the power budget is exceeded, or no more improvements can be made.

Accordingly, one aspect of the present invention provides a method for selectively decreasing a channel length of a transistor to be used in a semiconductor device. A timing database is provided. The timing database includes a plurality of circuit paths, at least two circuit paths each representing a path through a plurality of pins in a circuit design. Each of at least two of the plurality pins in each of the at least two circuit paths is associated with one of an input and an output of a respective cell in the circuit design. Each respective cell has at least one transistor, and each of the at least two circuit paths has an associated timing violation providing information about violation of at least one timing assertion. A subset of circuit paths is selected from the timing database. The subset includes at least one of the at least two circuit paths. The timing violation of each circuit path in the subset is within a range of timing violations. A pin criticality for each pin in each path within the subset is determined. At least one cell associated with a pin in the subset of circuit paths is replaced with a cell having a transistor with a reduced channel length. Replacement depends on the pin criticality of the pin associated with the at least one cell.

In another aspect of the invention, an apparatus includes a processor, a memory coupled to the processor, and a circuit design program at least partially storable in the memory and executable on the processor. The program includes a path selection routine for selecting a plurality of paths in a circuit design, at least one path including a plurality of pins, and having an associated timing violation providing information about violation of at least one timing assertion. The program also includes a pin criticality routine for determining a pin criticality for at least one pin in the at least one path, and a cell replacement routine for selectively replacing at least one cell associated with the at least one pin in the at least one path with a cell having a reduced channel length transistor. Replacement depends on the pin criticality of the at least one pin in the at least one path.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

In the following description, numerous specific details are set forth in order to provide a thorough understanding of the present invention. It will be obvious, however, to one having ordinary skill in the art that the present invention may be practiced without these specific details. In other instances, well-known circuits, structures and techniques have not been shown in detail in order not to unnecessarily obscure the present invention.

Figure 1:
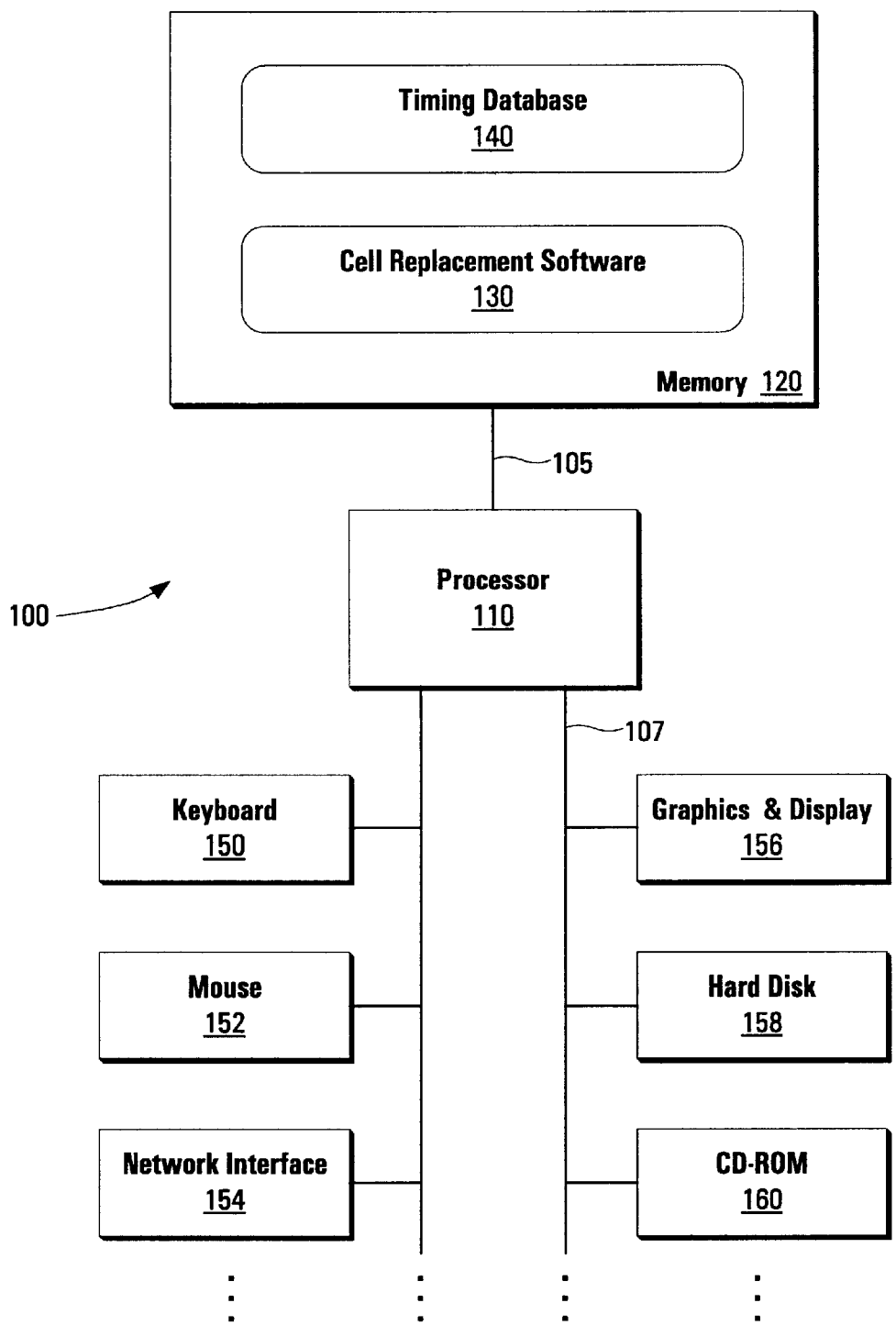
FIG. 1 is a block diagram of a computer system for implementing the tools and techniques of the present invention.

Because of the complexity of designing integrated circuits, many of the design steps are performed on a computer system. FIG. 1 illustrates a block diagram of a computer system 100 for implementing the design tools discussed below. Computer system 100 includes a processor 110 and a memory 120 coupled together by communications bus 105. Processor 110 can be a single processor or a number of individual processors working together. Memory 120 is typically random access memory (RAM), or some other dynamic storage device, and is capable of storing instructions to be executed by the processor, e.g., cell replacement software 130, and information used by the instructions, such as timing database 140. Memory 120 is also used for storing temporary variables or other intermediate information during the execution of instructions by the processor 110.

Cell replacement software 130 is one example of a software design tool, and in the present example, it is illustrative of a cell replacement method implemented in software. Those having ordinary skill in the art will ready recognize that the techniques and methods discussed below can be implemented in software using a variety of computer languages, including, for example, traditional computer languages such as assembly language, Pascal, and C; object oriented languages such as C++ and Java; and scripting languages such as Perl. Timing database 140 is one example of information that can be used by software such as cell replacement software 130 as part of the integrated circuit design process. Additionally, software 130 can be provided to the computer system via a variety of computer readable media including magnetic storage media (e.g., hard disk 158, a floppy disk, etc.), optical storage media (e.g., CD-ROM 160), and communications media conveying signals encoding the instructions (e.g., via a network coupled to network interface 154).

Computer system 100 also includes devices such as keyboard 150, mouse 152, network interface 154, graphics & display 156, hard disk 158, and CD-ROM 160, all of which are coupled to processor 110 by communications bus 107. It will be apparent to those having ordinary skill in the art that computer system 100 can also include numerous elements not shown in the figure, such as additional storage devices, communications devices, input devices, and output devices, as illustrated by the ellipsis shown.

Timing database 140 includes information produced by a static timing analyzer based on a netlist of the circuit design provided to the static timing analyzer. Examples of commercially available static timing analysis tools include PrimeTime by Synopsys, Inc., QuickPath by Mentor Graphics Corporation, and Afirma Pearl by Cadence Design System, Inc. These or other static analyzing tools provide pathbased, or in some cases node or arc based timing information about the integrated circuit design. Typically, timing information produced by these tools, and included in timing database 140, is in the form of a list of paths through the integrated circuit. Each path is defined by the nodes or pins associated with circuit elements or cells that are traversed by the path. Each pin is usually either an input to or an output from a cell, and thus each pin can have a timing delay contribution associated with it. The timing delay contribution for a given pin typically represents any timing delay associated with the portion of the circuit path between the preceding pin and the current pin. The cumulative propagation delay of the path is recorded for each path, and usually provided in units of picoseconds (ps). The timing constraints or assertions of the various cells along the path form a timing budget within which the circuit should perform. Additionally, the overall frequency of operation of the integrated circuit can contribute to the timing budget. Those paths having propagation delays that exceed the available budget are said to have a timing violation, usually indicated by the amount of time the budget is exceeded. Paths that exceed the budget typically have negative violation numbers, while paths that are within the budget are described with positive violation numbers. Note that the propagation delay of a path is often referred to as its timing violation, or violation number, regardless of whether it actually violates a timing constraint.

Figure 2:
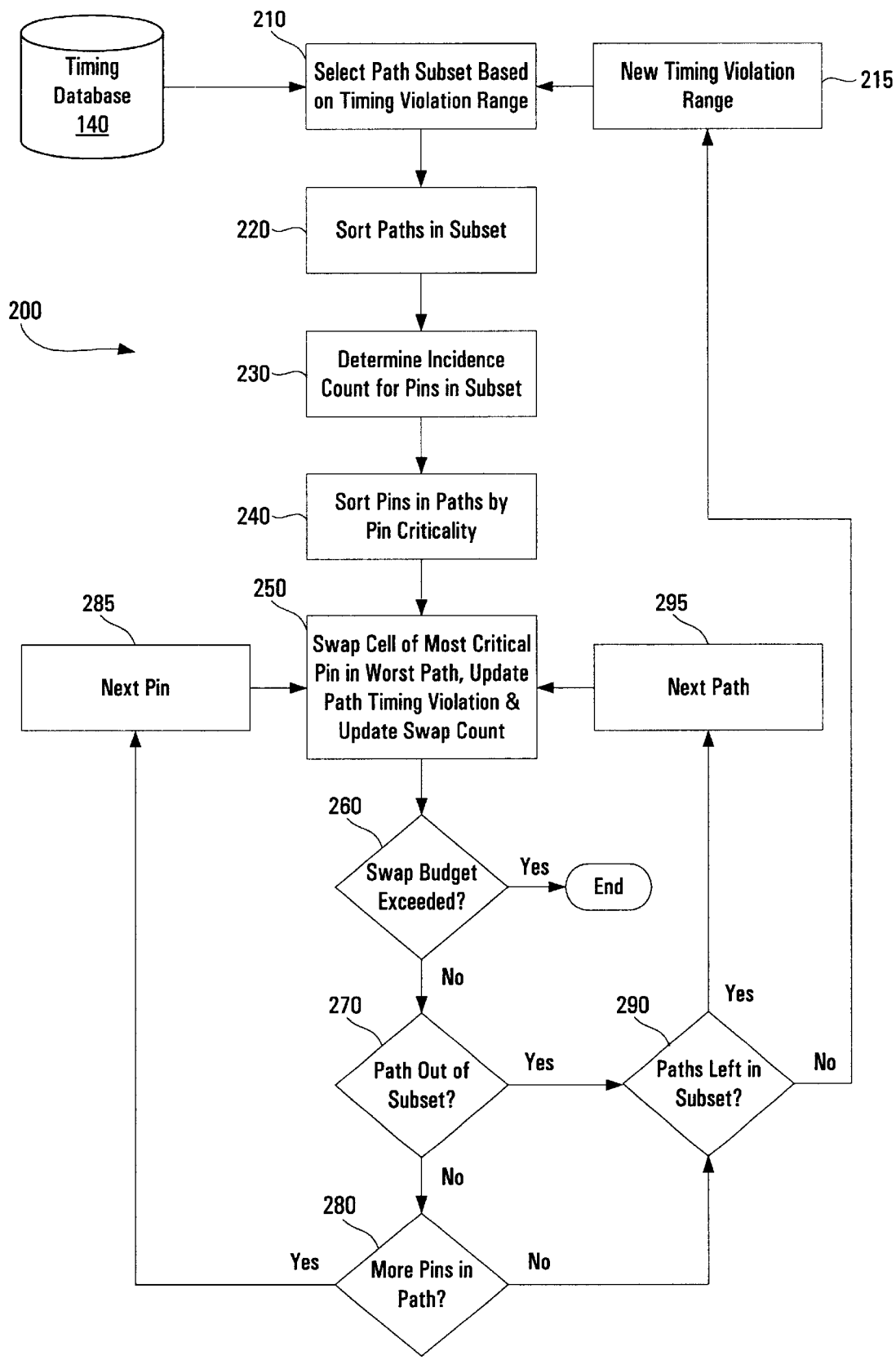
FIG. 2 is a flow chart illustrating an integrated circuit cell swap procedure.

FIG. 2 is a flow chart illustrating an integrated circuit cell swap procedure utilizing information from timing database 140. As indicated by cell replacement software 130, some or all of the procedure illustrated in FIG. 1 is usually performed by software. Additionally, the examples described below will focus on static timing analysis that provides information about setup time and hold time violations, but those having ordinary skill in the art will readily recognize that the tools and techniques described can be applied to static timing analysis data based on a variety of timing assertions.

Although there are many design, fabrication, and operation factors that will effect the performance of a cell, and thus effect the results of static timing analysis of that cell, the cell swapping tools and techniques of the present invention focus on a particular aspect of cell design, constituent transistor channel length. Thus, because the cell swapping tools and techniques do not directly consider parameters such as operating voltage, operating temperature, and fabrication process, the effect of these parameters on the timing characteristics of the cells, and thus the effect on the cell swapping choices made, are integrated into the development of the timing database.

For example, since the setup time is the minimum length of time that a data input pin must be stable before the active clock edge transition, it is preferable to have setup time static timing analysis based on operating and fabricating conditions that are likely to lead to generally longer switching times, i.e., slower cells, since the longer switch times increase the likelihood that signals may not get,to a memory cell on time. Such analysis provides the designer with worst case (or at least worst usable case) setup time information. Thus, in order to prepare the proper database, static timing analysis is conducted in the "typical corner" where, for example, the operating voltage is relatively low, the operating temperature is relatively high, and the fabrication process is a typical process. Note that the set of parameters is typically referred to as a "corner" because it is defined by three coordinates in a parameter space: voltage, temperature, and process. With worst case setup time provided in the timing database, the cell swapping tools and techniques can proceed to improve setup times by selectively increasing transistor switching speeds.

Figure 3:
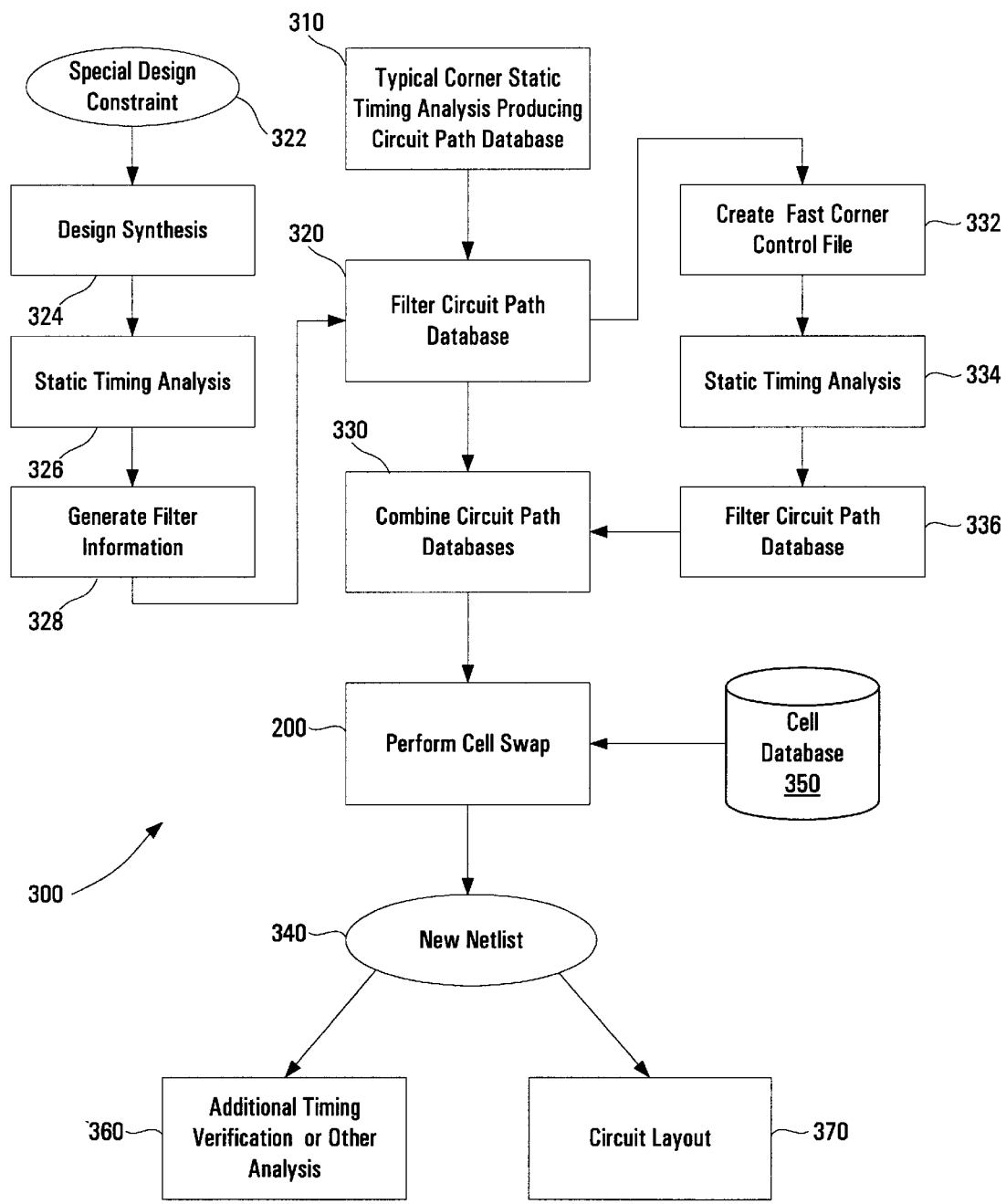
FIG. 3 is a flow chart illustrating a portion of an integrated circuit design flow, including the integrated circuit cell swap procedure shown in FIG. 2.

Similarly, worst case (or at least worst usable case) hold time information should be included in the timing database. Since hold time is the minimum length of time that a data input pin should be stable after the active clock transition, hold time information should be based on static timing analysis in a fast corner, that is with an operating voltage, operating temperature, and fabrication process chosen to produce the fastest (or at least fastest usable) switch times. Thus, fast corner static timing information provides the hold time slack for a pin or cell, that is the amount of time a given cell could be speed up without causing a path through the cell to have a hold time violation. As is seen in FIG. 3 (and described below) combining static timing analysis for the different corners is part of the design flow within which the cell swapping procedure is implemented.

With the requisite timing data provided by timing database 140, integrated circuit cell replacement procedure 200 begins at 210 with the selection of a subset of paths. Since a given circuit design may have numerous paths, a subset is chosen in order to efficiently target the paths with the worst timing violations. Based on a specified tolerance, e.g., 30 ps, a subset of paths is selected from timing database 140, each having a timing violation within the range indicated by the tolerance. For example, if the worst timing violation is −199 ps, and the specified tolerance is 30 ps, than the specified range is −199 ps to −170 ps, and the subset includes paths whose timing violations fall within this range. Note that depending on the number of paths in timing database 140, the complexity of the integrated circuit design, and the desired efficiency of operation, a smaller or larger tolerance can be specified. In fact, a tolerance large enough to include all violating paths (e.g., 200 ps for the example above) could be specified.

The paths in the subset are optionally sorted by timing violation as indicated in 220. Note that sorting is optional because, for example, the paths may already be provided in a sorted form from timing database 140 (thereby obviating the need for additional sorting) or the timing violation range that defines the subset may be so small that sorting is unnecessary. Nevertheless, it is desirable to have the paths sorted by timing violation so that the cell replacement procedure can operate on those paths having the worst timing violations first. Additionally, those having ordinary skill in the art will readily recognize that a variety of the steps illustrated in FIG. 2 can optionally be performed, or can be replaced by one or more equivalent steps.

Next, 230 indicates that an incidence count is determined for each of the pins in each of the paths in the subset. Since any given pin can occur in more than one path, e.g., an output pin on a cell having multiple inputs, replacement priority can be given to those pins whose replacement will benefit the most paths in the subset. Thus, each pin in the paths is given an incidence count, indicating the number of paths in which the pin is used. Note that the paths checked during the incidence count are typically confined to the paths that are in the subset, but incidence counting could include all paths in the integrated circuit design, or a smaller or larger subset of paths as desired.

The incidence count for a pin is one way to rank a pin's criticality in a particular path. Other factors contributing to a pin's criticality, and thereby the desirability of replacing its associated cell, include the potential speed increase of swapping cells (which may vary from pin to pin), the available hold time slack for the pin, power consumption of the cell associated with the pin, and a variety of other factors. In a typical example, the product of a pin's incidence count and the associated improvement are used to determine the pin criticality. Whatever method used, the pins in the paths are sorted by pin criticality in 240 so that within each path, the most critical pins are first to be examined and their associated cells possibly replaced.

As indicated by 250, cell replacement begins with the most critical pin, as determined by the pin criticality, in the path with the worst timing violation. Although the goal is to selectively replace at least one transistor associated with the pin, replacement is typically performed on the entire cell. For example, if the most critical pin in the path with the worst timing violation is one of the input pins of a two-input NAND gate, the entire gate would be replaced with a similar version of the gate, but using transistors in which the channel length has been reduced so as to provide a speed increase. Those having ordinary skill in the art will recognize that number of constituent transistors, including all of the constituent transistors, of a cell can be replaced. Additionally, other timing comparisons may be performed before or in conjunction with a cell replacement, such as, for example, determining the effect of replacement on the hold time slack of the path under consideration. If a replacement is made, the timing violation of the path is updated to reflect the improvement. Additionally, the timing violation of all other paths including the transistor or cell is typically updated to reflect the improvement. As noted above, the timing values will depend on the corner in which the static timing analysis is performed. So, for example, the path timing violation can be updated subsequent to a cell replacement by decreasing the magnitude of the violation number based on the timing difference between the regular cell and the shorter channel length cell as analyzed in the aforementioned typical corner. This would provide a conservative estimate of the improvement. Note also that this type of improvement information can be the same improvement information used to determine pin criticality. The hold time slack available can also be revised based on fast corner timing information. A count of the cells/transistors that have been replaced is maintained for comparison with the power budget.

That comparison is performed in 260. If the increased power consumption associated with replacing the cell is greater than the power budget, the process ends. The replaced cell can be returned to its normal version (not shown) so as to bring the circuit design back within its power budget. If the budget has not been exceeded, the timing violation of the path containing the pin for which a cell was replaced is examined in 270. If the updated timing violation causes the path to no longer fall within the specified range of the subset, no additional swapping needs to be performed, and the path can be removed from the subset, or simply ignored for the remainder of path analysis for the subset. Additionally, one or more additional paths may be removed from the subset if those paths were effected by the replacement to the extent that their respective updated timing violations cause the paths to no longer fall within the specified range of the subset. Note that the subset updating described herein can take place at 250, at 270, or at a variety of other points in the process. Whether there are any paths remaining in the subset is determined in 290. If there are still paths within the subset, a next path is chosen in 295, typically the path with the next worse timing violation, and the procedure returns to 250. If there are no more paths to be analyzed in the subset, a new timing violation range is selected, e.g., the next lowest range based on the specified tolerance, and the procedure returns to 210. If there are no more paths to examine, and/or the specified range is a range that should not be analyzed, e.g., positive timing violation numbers, the procedure can end (not shown).

When it is determined in 270 that the cell replacement has not improved the path sufficiently to render its timing violation outside the specified range of the subset, operation proceeds to 280 where it is determined whether there are additional pins to be examined in the path. If there are, a next pin is chosen in 285, typically the next most critical pin, and the procedure returns to 250. When there are no pins remaining in the path, 290 determines whether there are additional paths in the subset to be examined, and operation proceeds as described above. Note that the procedure can end if the a path cannot be improved beyond the subset (not shown) or it may continue as shown with the hope that other paths in the subset can have their timing violations reduced.

FIG. 3 is a flow chart illustrating a portion of an integrated circuit design flow 300, including the integrated circuit cell swap procedure shown in FIG. 2. FIG. 3 illustrates one of the many possible ways in which cell replacement procedure 200 can be integrated into an integrated circuit design flow, as will be readily recognizable to those having ordinary skill in the art. This portion of the flow begins at 310 with the production of a static timing database for the aforementioned typical corner, although timing analysis can be performed for some corner other than the typical corner if desired. The timing database produced is the basis for the timing database that will ultimately be used to perform cell swap 200. The timing database can then be optionally filtered at 320 according to limitations or design constraints imposed by the designer. Note that between steps that are typically performed by different pieces of software, e.g., 310 and 320, there can be intermediate steps that, for example, convert the format of the output from one tool to a format usable by the next tool. Such intermediate steps have been left out of FIG. 3 for clarity, but will be readily apparent to those having ordinary skill in the art.

322 represents a design constraint that the integrated circuit designer chooses to impose on some or all of the circuit design. Typically, the constraint is limited to certain portions of the circuit design, thus making application desirable through a filter process, instead of through the netlist provided to the static timing analyzer for 310. In general, the filtering process is a way by which circuit designers can have the flexibility to control various aspects of the design. For example, if a designer knows that certain paths will absolutely have to be changed, absolutely cannot be changed, or are false paths, the filtering process can accommodate those constraints. The filter can also be used to remove certain paths having certain timing violations from the timing database, thereby making the timing database smaller and allowing swapping procedure 200 to be performed more quickly.

One example of a use for the filtering step is special handling for buses in a circuit design. Since communications busses typically include multiple wires that transmit signals (e.g., the individual bits of a multi-bit bus) simultaneously, designers often want the timing characteristics of the paths along each of the lines of the bus to be uniform. Thus, a change to a cell on one bus line, can prompt similar changes on the other bus lines so the overall bus performance is more uniform, even though the other lines might not otherwise need the cell change. One way to accomplish this is to use the filtering option to adjust the timing violation of the paths associated with the additional bus lines to match that of the path having a legitimate timing violation. Thus, by "tricking" the cell swap procedure into replacing cells on these other paths, when normally their timing violations would not prompt replacement, the bus timing characteristics can be kept more uniform. Other examples of design conditions that can be addressed through the filter process include: clock low latch paths, half-cycle paths, and known silicon critical paths.

Thus, once a special design constraint is determined, an appropriate new netlist is generated at 324. Static timing information is determined for paths effected by the constraint in 326, and filter information is generated based on the new timing analysis in 328. Note that in some instances, filter information can be specified directly, thereby avoiding 324 and 326. The filter information is used in 320 to adjust the information in the timing database as appropriate. Since the filtering process is optional, 320 can be avoided, but in either case (i.e., filtering or not) the typical corner timing information can be passed on to 332. Fast corner timing information is generated in 332–336. Whether based on the filtered typical corner database, and unfiltered typical corner database, or even a separate input (not shown), a control file is developed and supplied to static timing analysis 334. As mentioned above, the fast corner timing database provides hold time slack information. The database is optionally filtered in 336, in a manner similar to that outlined in 322–328, and then combined with the typical corner database in 330. That combination yields timing database 140 shown in FIG. 2, which is used by cell replacement procedure 200 as previously described. Cell database 350 includes information about each type of cell in at least two different versions (one where transistors have normal channel lengths, and one where transistors have shortened channel lengths), and can also have cell information for a variety of corners, e.g., typical and fast corners. The results of the swapping procedure are used to produce a new netlist 340 which can then be used for additional timing verification (e.g., another iteration of process 300) or other circuit analysis and verification. Additionally, netlist 340 can serve as the final netlist for circuit layout and fabrication 370.

Those having ordinary skill in the art will readily recognize a number of variations in implementation and parameter dependence. For example, the cell swapping procedure can be implemented with more than one alternative channel length. The design flow could begin with all of the cells being a short channel length version, and then proceed to replace the short channel length versions with normal versions where tolerable. Replacement can be based on cells (which include logic gates, a flip-flops, latches, etc.) or may be performed an a larger scale with macros. The design flow can be applied to an entire integrated circuit design, or one or more blocks within that design. Each specified range of paths examined can be based on the same tolerance, or successively different tolerances. Other tools can be utilized at various stages in design flow 300. Some or all of the procedures described herein can be implemented in software and executed on a computer system.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A method for selectively decreasing a channel length of a transistor to be used in a semiconductor device comprising:

providing a timing database including a plurality of circuit paths, at least two circuit paths each representing a path through a plurality of pins in a circuit design, each of at least two of the plurality pins in each of the at least two circuit paths being associated with one of an input and an output of a respective cell in the circuit design, each respective cell having at least one transistor, and each of the at least two circuit paths having an associated timing violation providing information about violation of at least one timing assertion;

selecting a subset of circuit paths from the timing database including at least one of the at least two circuit paths, the timing violation of each circuit path in the subset being within a range of timing violations;

determining a pin criticality for each pin in each path within the subset;

replacing at least one cell associated with a pin in the subset of circuit paths, with a cell having a transistor with a reduced channel length, the replacing depending on the pin criticality of the pin associated with the at least one cell.

2. The method of claim 1 further comprising:

adjusting the timing violation of a path including the pin associated with the at least one cell.

3. The method of claim 2 wherein for each path having a timing violation, the timing violation is an amount of time by which the at least one timing assertion is violated, the adjusting further comprising:

correcting the timing violation of the path including the pin associated with the at least one cell based on a timing difference between the at least one cell and the cell having a transistor with a reduced channel length.

4. The method of claim 2 further comprising:

repeating the replacing and adjusting for a plurality of pins in the path including the pin associated with the at least one cell until the occurrence of at least one of:
the timing violation of the path is outside the range of timing violations; and
each pin in the path has had at least one associated cell replaced.

5. The method of claim 4 further comprising:

repeating the replacing and adjusting for a plurality of pins in another path including another pin associated with at least one cell until the occurrence of at least one of:
the timing violation of the another path is outside the range of timing violations; and
each pin in the another path has had at least one associated cell replaced.

6. The method of claim 4 further comprising:

repeating the replacing and adjusting for each pin in each path within the subset until the occurrence of at least one of:
the timing violation of the each path within the subset is outside the range of timing violations; and
each pin in each path within the subset has had at least one associated cell replaced.

7. The method of claim 6 further comprising;

selecting a second subset of circuit paths from the timing database including at least one of the at least two circuit paths, the timing violation of each circuit path in the subset being within a second range of timing violations;

determining a pin criticality for each pin in each path within the second subset;

replacing at least one cell associated with a pin in the second subset of circuit paths, with a cell having a transistor with a reduced channel length, the replacing depending on the pin criticality of a pin associated with the at least one cell associated with a pin in the second subset of circuit paths.

8. The method of claim 7 wherein the second range of timing violations is less than the range of timing violations.

9. The method of claim 1 further comprising:
sorting the paths in the subset of circuit paths by timing violation; and wherein the path including the pin associated with the at least one cell is a worst timing violation path.

10. The method of claim 1 further comprising:
sorting the pins in a path including the pin associated with the at least one cell by pin criticality; and wherein the pin criticality of the pin associated with the at least one cell is a most critical pin.

11. The method of claim 1 further comprising:
determining an incidence count for each pin in each path within the subset of circuit paths, the incidence count representing the number of times each pin occurs within the subset of circuit paths.

12. The method of claim 11 wherein the pin criticality depends on at least one of the incidence count, a timing difference between the at least one cell and the cell having a transistor with a reduced channel length, and a power consumption associated with the at least one cell.

13. The method of claim 1 further comprising:
accounting for a penalty associated with replacing the at least one cell associated with a pin in the subset of circuit paths.

14. The method of claim 13 wherein the accounting further comprises:
incrementing a replacement counter.

15. The method of claim 13 wherein the penalty is associated with a leakage current of the transistor with a reduced channel length.

16. The method of claim 1 wherein each path represents a unique path through the plurality of pins in the circuit design.

17. The method of claim 1 wherein at least two of the respective cells are the same cell.

18. The method of claim 1 wherein at least one of the respective cells is one of a logic gate, a flip-flop, and a latch.

19. The method of claim 1 wherein the at least one timing assertion based on at least one of a setup time, a hold time, a recovery time, a removal time, and a pulse width.

20. The method of claim 1 encoded in a computer readable medium as instructions executable on a processor, the computer readable medium being one of a magnetic storage medium, an optical storage medium, and a communications medium conveying signals encoding the instructions.

21. The method of claim 1 wherein the timing database is produced by a static timing analysis tool.

22. An apparatus comprising:
a processor:
a memory coupled to the processor; and
a circuit design program at least partially storable in the memory, and executable on the processor, the program including:
a path selection routine for selecting a plurality of paths in a circuit design, at least one path including a plurality of pins, and having an associated timing violation providing information about violation of at least one timing assertion;
a pin criticality routine for determining a pin criticality for at least one pin in the at least one path;
a cell replacement routine for selectively replacing at least one cell associated with the at least one pin in the at least one path with a cell having a reduced channel length transistor, replacement depending on the pin criticality of the at least one pin in the at least one path.

23. The apparatus of claim 22 wherein the path selection routine selects the plurality of paths from a timing database.

24. The apparatus of claim 23 wherein the timing database is produced by a static timing analysis tool.

25. The apparatus of claim 22 wherein the path selection routine selects the plurality of paths based on timing violations.

26. The apparatus of claim 25 wherein each timing violation is an amount of time by which the at least one timing assertion is violated, and wherein the path selection routine selects the plurality of paths based on timing violations within a specified range of timing violations.

27. The apparatus of claim 22 wherein the at least one timing assertion is based on at least one of a setup time, a hold time, a recovery time, a removal time, and a pulse width.

28. The apparatus of claim 22 wherein the program further comprises:
a timing violation adjustment routine for adjusting the timing violation of the at least one path.

29. The apparatus of claim 22 wherein the program further comprises:
a replacement penalty routine for accounting for a penalty associated with replacing the at least one cell associated with the at least one pin in the at least one path, wherein the penalty is associated with a leakage current of the reduced channel length transistor.

* * * * *